(12) United States Patent
Nogueira-Nine

(10) Patent No.: US 8,630,582 B2
(45) Date of Patent: Jan. 14, 2014

(54) OUT-OF-BAND RADIO LINK PROTOCOL AND NETWORK ARCHITECTURE FOR A WIRELESS NETWORK COMPOSED OF WIRELESS TERMINALS WITH MILLIMETRE WAVE FREQUENCY RANGE RADIO UNITS

(75) Inventor: Juan Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 289 days.

(21) Appl. No.: 12/858,056

(22) Filed: Aug. 17, 2010

(65) Prior Publication Data

US 2011/0053498 A1 Mar. 3, 2011

(30) Foreign Application Priority Data

Sep. 2, 2009 (EP) .................................... 09169214

(51) Int. Cl.
*H04B 7/14* (2006.01)
(52) U.S. Cl.
USPC ............... 455/25; 455/62; 455/423; 455/425; 455/550.1
(58) Field of Classification Search
USPC .......................................................... 455/25
See application file for complete search history.

(56) References Cited

U.S. PATENT DOCUMENTS

| | | | | |
|---|---|---|---|---|
| 5,566,355 A * | 10/1996 | Kanai | .............................. | 445/25 |
| 5,805,982 A * | 9/1998 | Hulsebosch | .................... | 455/62 |
| 6,101,383 A * | 8/2000 | Poon | ............................ | 455/425 |
| 6,510,174 B1 * | 1/2003 | Sexton et al. | ................. | 375/213 |
| 6,690,917 B2 | 2/2004 | Soliman et al. | | |
| 6,763,195 B1 | 7/2004 | Willebrand et al. | | |
| 7,130,586 B2 | 10/2006 | Corbett et al. | | |
| 7,239,894 B2 | 7/2007 | Corbett et al. | | |
| 7,394,988 B1 | 7/2008 | Johnson et al. | | |
| 7,457,587 B2 | 11/2008 | Chung | | |
| 8,036,257 B2 * | 10/2011 | Mailaender | .................... | 375/148 |
| 2003/0220125 A1 * | 11/2003 | Ito et al. | ..................... | 455/550.1 |
| 2006/0262759 A1 | 11/2006 | Bahl et al. | | |
| 2007/0037528 A1 | 2/2007 | Doan et al. | | |
| 2007/0300266 A1 * | 12/2007 | Casas et al. | ..................... | 725/81 |
| 2008/0214182 A1 * | 9/2008 | Wang et al. | ................... | 455/423 |

FOREIGN PATENT DOCUMENTS

| | | |
|---|---|---|
| EP | 1 280 296 A1 | 1/2003 |
| WO | WO 2008/088186 A1 | 7/2008 |

OTHER PUBLICATIONS

Yuxin Pan, et al. "A Two-Channel Medium Access Control Protocol for Mobile Ad Hoc Networks using Directional Antennas", IEEE 16th International Symposium on Personal, Indoor and Mobile Radio Communications, 2005. pp. 1361-1365.

ECMA International: Final Draft Standard ECMA-XXX; High rate 60 GHz PHY, MAC and HDMI PAL 1st Edition. ECMA/TC48/2008/144. Oct. 2008. 339 pages.

* cited by examiner

*Primary Examiner* — Ajibola Akinyemi
(74) *Attorney, Agent, or Firm* — Oblon, Spivak, McClelland, Maier & Neustadt, L.L.P.

(57) ABSTRACT

The present invention relates to a wireless transmitter comprising a transmitter radio unit working a wireless transmitter comprising a transmitter radio unit working in the millimeter wave frequency band using a directional antenna and a bidirectional radio unit working in a frequency range different from said transmitter radio unit and using an omnidirectional antenna. The invention further relates to a wireless receiver and a wireless relay.

11 Claims, 8 Drawing Sheets

OUT-OF-BAND RADIO LINK PROTOCOL AND NETWORK ARCHITECTURE FOR A WIRELESS NETWORK COMPOSED OF WIRELESS TERMINALS WITH MILLIMETRE WAVE FREQUENCY RANGE RADIO UNITS

TECHNICAL FIELD

The present invention relates to the field of telecommunications, such as wireless terminals with millimeter wave radios, in particular it relates to novel wireless terminals using directional antennas and omnidirectional antennas for seamless high data transmission.

BACKGROUND ART

The continuously increasing demand for higher bandwidth in the actual non-licensed wireless communication systems, aiming to transmit high resolution video streams which need data rates in the multi-GBbps ranges forced a search for frequency ranges where such a bandwidth is available like the unlicensed 60 GHz ISM band also known as millimeter wave band (mm-wave) or other unlicensed frequency bands.

The several GHz of bandwidth available in these bands, however, is accompanied by a severe free space path loss which limits the operation range. Furthermore, mm-waves do not pass through objects or people. Hence, mm-waves will not penetrate walls and a person passing through a 60 GHz link will also block the transmission completely. A wireless network based on this technology, e.g. to distribute high definition video content into a household, needs to hop over one or more intermediate nodes to reach a destination placed in another room.

To compensate the path losses, the radios in the wireless terminals running at these high frequencies employ one or multiple beam directional antennas. These type of antennas are capable to orientate one or more antenna beams in a specific direction (within the physical limits of the specific antenna) by steering the main beam in that direction (beam steering antennas) or by switching on the beam with the closest orientation to the desired one (beam switching antennas). The benefits are threefold:
1. The directional antenna gain compensates for the propagation losses
2. Thanks to a beam selection algorithm the radio link control (RLC) procedure has detailed information about the channel conditions which can analyse to select the best antenna beams combination between transmitter and receiver.
3. Additionally, a beam tracking algorithm keeps the RLC continuously informed about the channel conditions of the active antenna beam combination and the other possible ones.

Some beam selection and tracking algorithms proposed in the literature work under the assumption that the channel for every antenna beam combination can be sounded/measured at any time using a specific PHY frame sent by a transmitter. These frames are used in the receiver to estimate several characteristics of the wireless channel like the power delay profile, SNR, etc. Such characteristics are then employed by the beam selection or tracking algorithm to calculate one or more parameters which directly relate to the channel quality for the specific beam combination (link).

However, the main problem with above approach consists in how to reliably sending back to the transmitter the measurements done at the receiver for every antenna beam combination in order to run the beam selection and tracking algorithms effectively. The timely provision of this information on the transmitting side is critical for seamlessly switching to another antenna beam combination in case of a sudden heavy degradation (e.g. temporal obstructions) of the channel quality.

On the other hand, even if no obstruction or any other channel degradation occurs in the directional data channel, sending additional control information over the same mm-wave channel can cause excessive delays if a retransmission of data is necessary, eventually blocking the content source transmission. This is particularly an issue in high definition content streaming applications which are very sensitive to delays, since some control information has to be exchanged between the data source and the data consumer like HDCP (High bandwidth Digital Content Protection).

Moreover, using the same mm-wave radio to send the measurements information back to the transmitter also forces the wireless terminals to implement a complete mm-wave radio transceiver (transmitter and receiver), although most of the devices this multi-Gbps technology is intended to are usually either data producers (Blue-Ray player, HD Camcorders, Game consoles with HD output, still cameras and so forth), or data consumers (TV, Beamer and so forth). Therefore, implementing an out-of-band back channel would save resources in the mm-wave radios: instead of complete radio transceivers, the data producers would implement only a mm-wave transmitter and the data consumers only a receiver.

Therefore, for at least the above reasons, it is not recommendable to use the same antenna link for sending back control and measurement data, because this channel may not be very robust due to sudden obstructions, the sent back control data may create unacceptable delays in streaming the user data (e.g. movie) and lastly, subjects consumer electronic devices to the heavy burden of implementing costly two way radios.

DISCLOSURE OF THE INVENTION

The object of the present invention is to overcome the previously mentioned problems and to propose a possibility to exchange control and measurement data in a robust and secure mode.

This object is achieved by a wireless transmitter comprising a transmitter radio unit working in the millimeter wave frequency hand using a directional antenna and a bidirectional radio unit working in a frequency range different from said transmitter radio unit and using an omnidirectional antenna.

The above object is further achieved by a wireless receiver comprising a receiver radio unit working in the millimeter wave frequency band using a directional antenna and a bidirectional radio unit working in a frequency range different from said receiver radio unit and using an omnidirectional antenna.

The above object is further achieved by a wireless relay comprising a receiver radio unit working in the millimeter wave frequency band using a first directional antenna, a transmitter radio unit working in the millimeter wave frequency band using a second directional antenna different from said first directional antenna and a bidirectional radio unit working in a frequency range different from said receiver radio unit and said transmitter radio unit and using an omnidirectional antenna.

The invention provides for a very robust solution since the back channel in form of the second out-of band wireless channel is omnidirectional, is uncoupled from the delay sensitive consumer data channel, has a greater range and penetrates obstacles to a greater extent than mm-waves. Subsequently, in order to maintain a steady data flow via the directional antennas the proposed out-of-band channel can provide important control data in a timely fashion, even if temporal obstructions hamper the data transmission between the directional antennas.

Further advantageous features are claimed in the respective subclaims.

Advantageously, the directional antenna in the wireless transmitter may provide one or more beams.

The wireless transmitter may further comprise a radio link control unit (RLC) to control said radio units.

The wireless transmitter may further comprise a sounding channel frame generator for sending channel sounding frames transmission messages via the transmitter radio unit to determine channel conditions of an active antenna beam combination and other possible ones with a wireless receiver or a wireless relay.

The bidirectional radio unit is advantageously adapted to receive channel measurement values from the wireless receiver or wireless relay.

The wireless transmitter may further comprise a ranking list database comprising a table containing the channel measurement values of the active antenna beam combination and other possible ones.

Preferably, the directional antenna in the wireless transmitter may provide one or more beams.

The wireless receiver may further comprise a radio link control unit (RLC) to control said radio units.

The wireless receiver may further comprise a channel measurement unit for collecting channel measurement values of an active antenna beam combination and other possible ones with a wireless transmitter or a wireless relay.

The bidirectional radio unit in the wireless receiver is advantageously adapted to send channel measurement values to the wireless transmitter or wireless relay.

The wireless receiver may further comprise a ranking list generator adapted to generate and rank the channel measurement values of the active antenna beam combination and other possible ones.

Advantageously, each of the directional antennas in the wireless relay may provide one or more beams.

The wireless relay may further comprise a radio link control unit (RLC) to control said receiver and transmitter radio units.

The bidirectional radio unit in the wireless receiver is advantageously adapted to forward channel measurement values from a wireless receiver or another relay to a wireless transmitter or said another relay.

The receiver radio and the transmitter radio unit in the wireless relay are advantageously adapted to forward channel sounding frames transmission messages from the wireless transmitter or another relay to the wireless receiver or said another relay.

BEST MODE FOR CARRYING OUT THE INVENTION

In the following description, the present invention is explained in more detail in relation to the enclosed drawings in which FIG. 1 shows a wireless transmitter terminal with a directional and an omnidirectional antenna.

Figure 1:
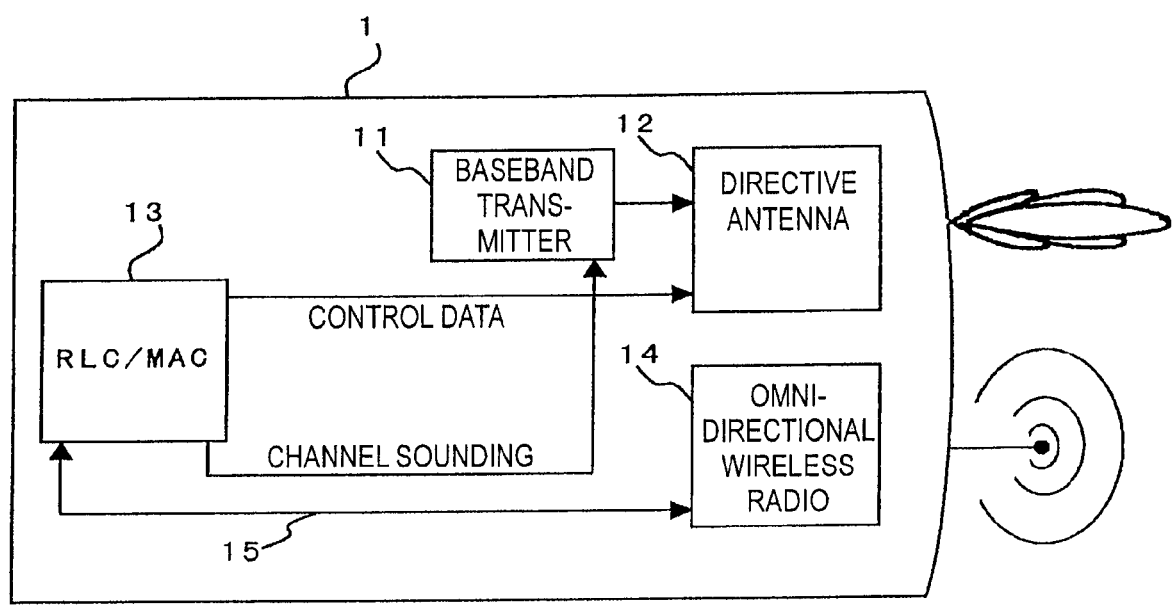

It is to be understood that only elements important for the understanding of the present invention are shown in the drawings. Further elements necessary for the operation of a wireless transmitter, for a wireless receiver or for a wireless relay are omitted for the sake of clarity.

Further, it is to be noted that the expressions "transmitter", "receiver" or "relay" used in the following are equivalent to the used terms "wireless transmitter terminal", "wireless receiver terminal" or "wireless relay terminal" respectively. In the same vane the expressions "omnidirectional wireless radio" and "out-of-band wireless unit" are used interchangeably.

FIG. 1 shows a wireless transmitter terminal 1 according to the present invention with a transmitter radio unit 11 operating in the mm-wave (e.g. 60 GHz or any other suitable range) frequency range, coupled with a directional antenna 12 having one or more beams that are either switched, formed or steered into a desired direction. A radio link control unit (RLC) is provided to switch, steer or form the antenna beams. The same RLC 13 also controls a second bidirectional and omnidirectional wireless radio 14 operating in a different frequency band (e.g. 2.4 GHz or 5 GHz) and receives channel measurement values from a wireless receiver terminal via a control line 15 to be processed and transformed into control data for the directional antenna. This device has means to accept high definition content information from the application layer and transmit it wirelessly to its destination. One of these means is a baseband transmitter 11 which preferable implements a single carrier transmitter although OFDM or any other modulation technique could be used.

Figure 2:
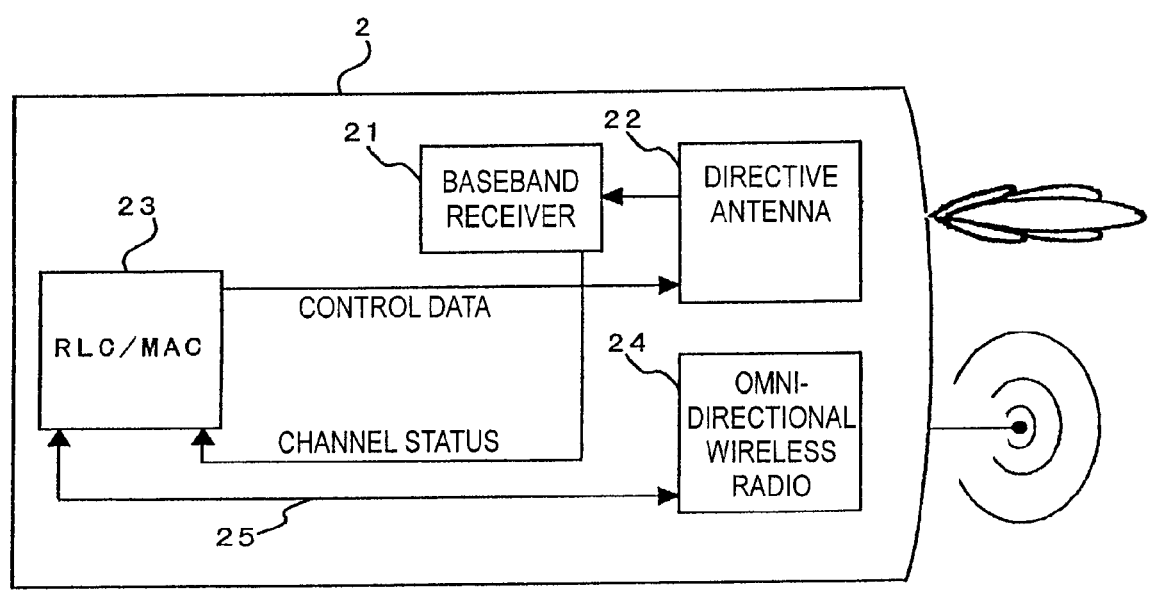
FIG. 2 shows a wireless receiver terminal with a directional and an omnidirectional antenna.

FIG. 2 shows a wireless receiver terminal 2 according to the present invention with a receiver radio unit 21 operating in the mm-wave (e.g. 60 GHz) frequency range, coupled with a directional antenna 22 having the same capabilities as the directional antenna of above embodiment. A radio link control unit (RLC) is provided to switch, steer or form the antenna beams. The same RLC 23 also controls a second bidirectional and omnidirectional wireless radio 24 operating in a different frequency band (e.g. 2.4 GHz or 5 GHz) and sends channel measurement values via a control line 25 to the omnidirectional wireless radio which transmits them back to the wireless transmitter terminal. This device has means to wirelessly receive high definition content information and pass it on to the application layer. One of these means is a baseband receiver 21 which preferable implements a single carrier receiver with a frequency domain equalizer (SC-FDE), although OFDM or any other modulation technique could be use.

Figure 3:
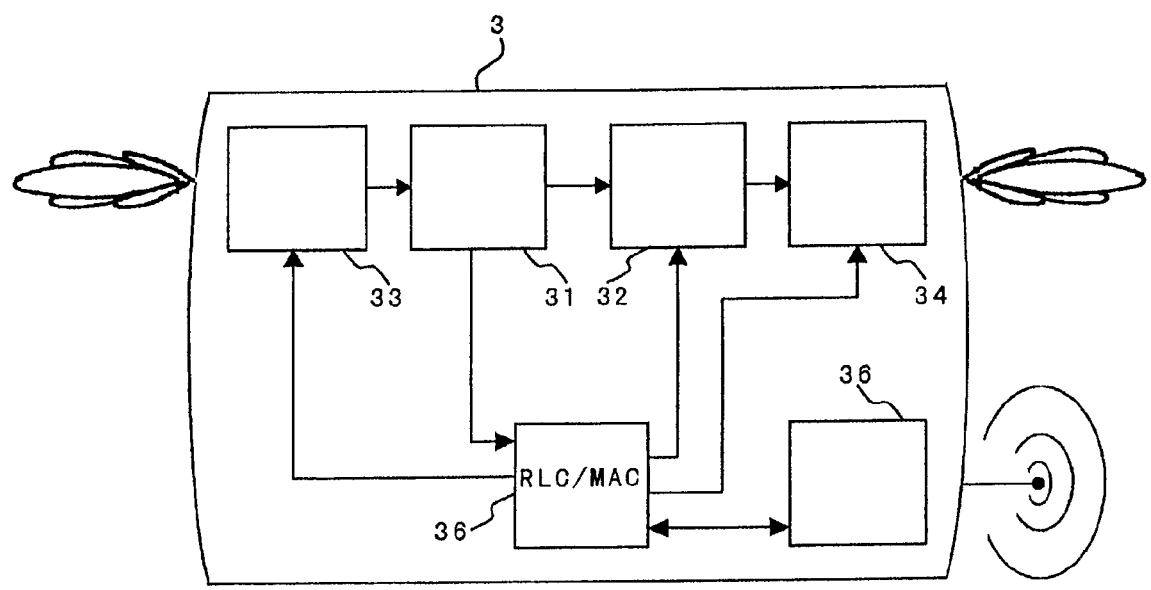
FIG. 3 shows a wireless relay with a first and a second directional and an omnidirectional antenna.

FIG. 3 shows a wireless relay terminal 3 according to the present invention with a receiver 31 and a transmitter radio unit 32 operating in the mm-wave (e.g. 60 GHz) frequency range, each one coupled with a directional antenna 33 or 34 having the same characteristics as the directional antennas in above embodiments. It also implements a bidirectional and omnidirectional wireless radio 35 operating in a different frequency band (e.g. 2.4 GHz or 5 GHz). This device has means to wirelessly receive and transmit again high definition content information. Some of these means are a baseband transmitter 32 and a baseband receiver 31 which preferably implements a single carrier transmitter or a single carrier receiver with a frequency domain equalizer (SC-FDE), although OFDM or any other modulation technique could be use. Each of the baseband transmitter and receiver could be attached to different independent antennas (as in FIG. 3) or they could share one and the same antenna in a time division manner. This device acts as a relay to extend the coverage area of the network for the mm-wave radio, for the omnidirectional one, or for both.

Figure 4:
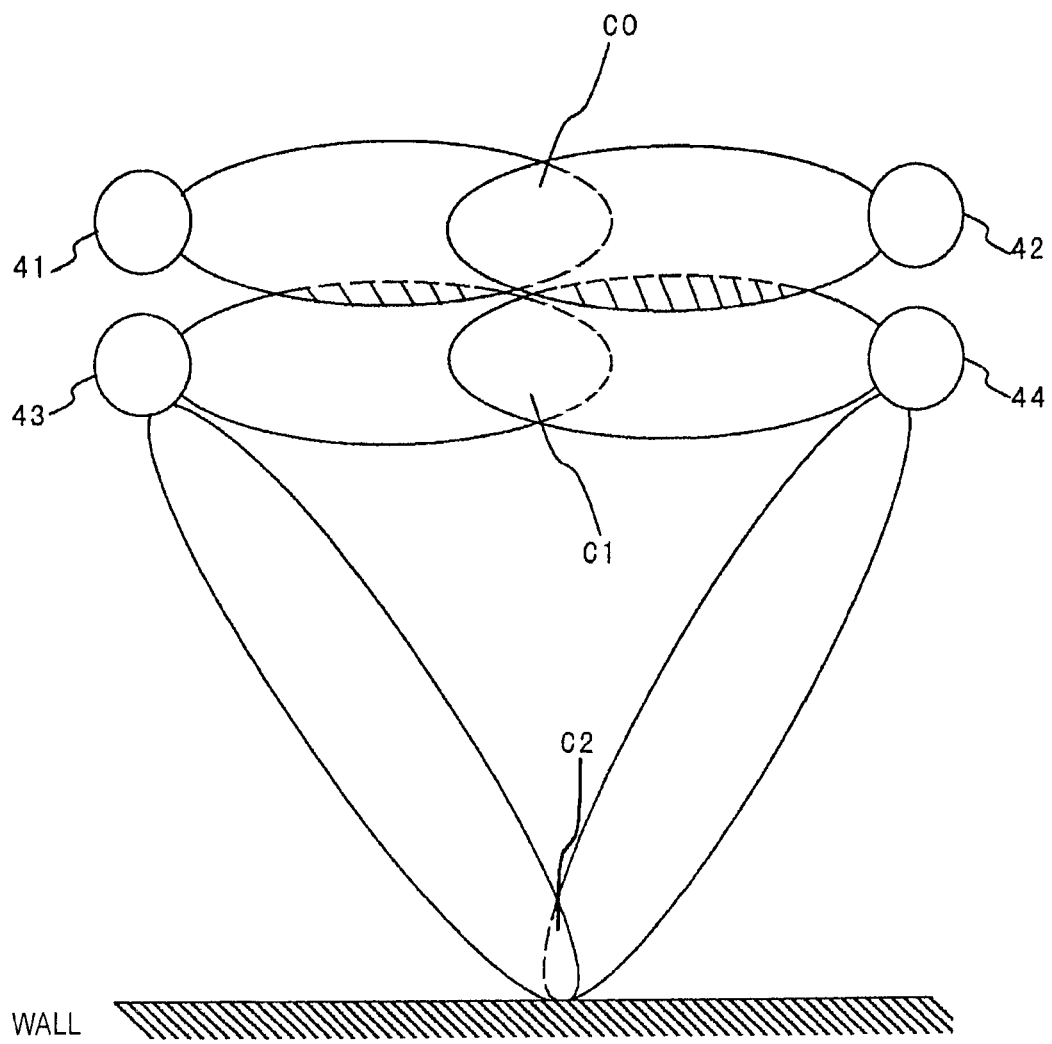
FIG. 4 shows the process of selecting a useful beam combination between two embodiments of a wireless transmitter terminal and a wireless receiver terminal.

In order to align these directional antennas comprised in the above three embodiments of wireless terminals running at these high frequencies a beam switching, forming or steering algorithm respectively needs to be implemented. At first, some kind of beam selection algorithm needs to be implemented to find the best antenna beam combination between the transmitter and the receiver to start with. Then, some beam tracking to keep the system always running through the best antenna beam combination needs to be implemented as well. To select the best beam combination, some channel measurements need to be performed. The main problem for the RLC comprised in above three wireless devices running the beam switching/-steering algorithm is to exchange the channel measurements through a robust channel. The beam switching or beam steering algorithm in the different types of terminals works in two phases:

FIG. 4 shows the first phase, the beam selection phase. In this first phase all the possible beam combinations between the embodiment of a wireless transmitter terminal 43 and an embodiment of a wireless receiver terminal 44 are tested and the channel quality of each one is measured. As can be seen a direct line of sight (LOS) connection C1 is not possible due to crosstalk with a pre-existing connection C0 between similar devices 41 and 42. However, signals bouncing back (albeit weaker) from a wall constituting a Non-LOS configuration C2 can be used. With these values, a ranking list is created by the receivers with the best links placed on the top positions of the list. During this process, independently of the concrete algorithm being implemented, control messages have to be exchanged between the wireless transmitter terminals and the wireless receiver terminals to synchronize the beam selection to be tested, to retransmit lost channel sounding frames, to send the channels measurements back to the transmitter or to finally send the created ranking list to the transmitter. All this control communication happens through the out-of-band wireless units comprised in the transmitter and receiver respectively.

Figure 5:
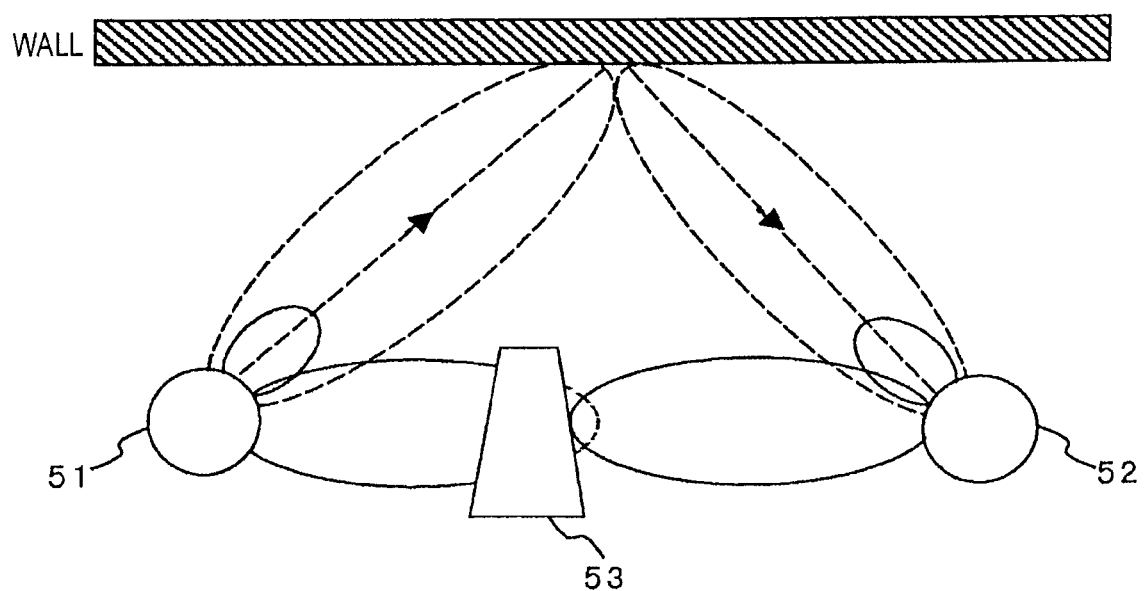
FIG. 5 shows the process of beam tracking.

FIG. 5 shows the second phase, called beam tracking phase. It starts after the mentioned list has been created. During this phase the user data communication is already taking place. Every data frame being transmitted by an embodiment of a transmitter 51 includes also a channel sounding frame in such a way, that an embodiment of a receiver 52 is able to continuously monitor the link being used. This allows it to quickly detect if a degradation of the link is happening due to a person or sudden obstacle 53 in the transmission corridor and, in case the value measuring the link quality goes down below some threshold, it can react by seamlessly changing the data transmission to the next good beam combination. The out-of-band link is also used to provide a robust handover in this case.

Figure 6:
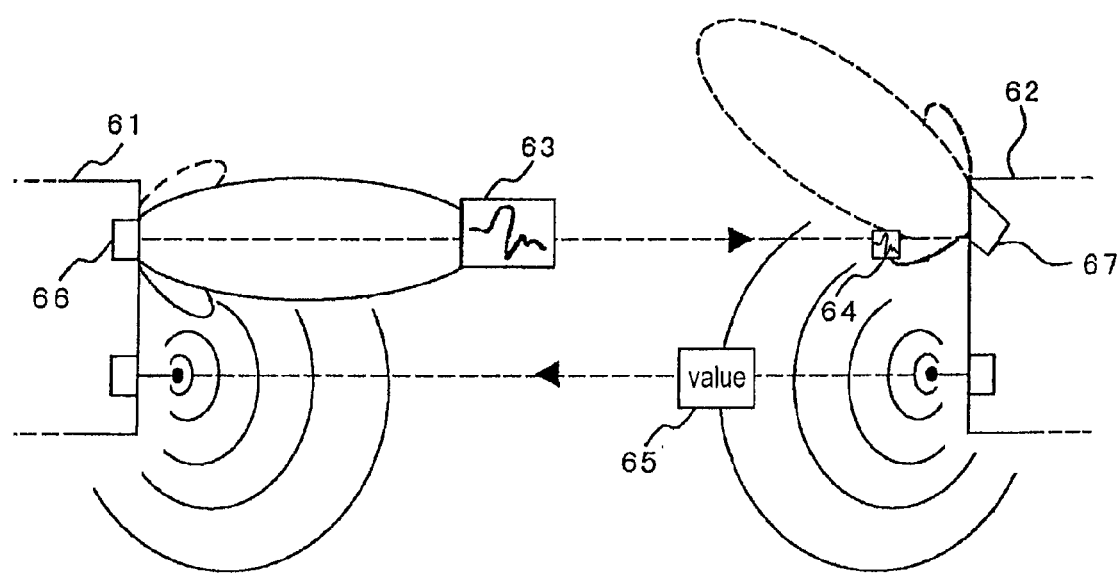
FIG. 6 shows the process of sounding data transmission channels.

FIG. 6 illustrates the "sounding" process designed to measure the channel quality for a particular antenna configuration between embodiments of the transmitter 61 and the receiver 62 by sending sounding frames 63. Now, in case of a sudden deterioration of the LOS connection or as depicted in this illustration, if the receiving directional antenna 67 is not aligned with the transmitting directional antenna 66 the strength of the received channel sounding frame signal 64 will be small or even zero. Since the transmission path between transmitter and receiver is obviously completely obstructed in the latter case, the result of the measurement (zero value) cannot be sent back to the transmitter on the same channel to initiate a quick switch over to another antenna path configuration. But the proposed out-of-band link in the lower GHz realm is able to better penetrate obstacles and eventually sends back to the transmitter the result/value of the channel measurement 65 to initiate a quick switch to another antenna configuration.

Therefore, if the actual link quality starts to degrade, the RLC unit can quickly react handing the data communication over to the next best link. At the same time, during the gaps between data frames, more channel sounding frames are transmitted and the control messages and the ranking table adaptation information is transmitted using the out-of-band link in order to update the information of the ranking list for the other beam combinations.

Figure 7:
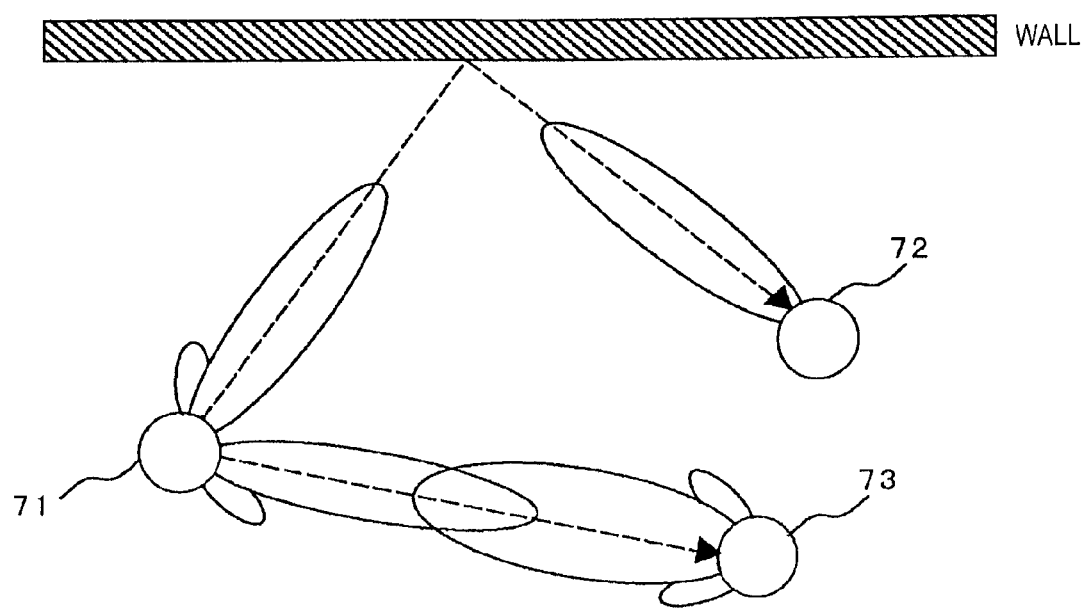
FIG. 7 shows the process of collaborative beam selection.

It is important to note, that beam switching, forming or steering does not necessarily mean that the antenna has a radiation pattern with a big main lobe, pointing to one selectable direction, and very small side lobes. Possible radiation patterns may include two or more main lobes pointing to different directions as depicted in FIG. 7. This type of radiation pattern could be beneficial in situations where an HD wireless source device, which is an embodiment of a transmitter 71 broadcasting high definition data, broadcasts its content to two HD wireless sink devices 72 and 73, which are embodiments of receivers located at different positions. The benefit of having the omnidirectional back channel is that the beam selection algorithm (we could also call it "radiation pattern selection algorithm") does not need to be run on a peer-to-peer basis but it can be applied to peer-to-multi-peer situation, where two or more receivers try to find "together" the best transmitter radiation pattern which provides a reliable link to all the involved receivers. Such a collaborative selection could not be possible without a robust and separated (out of band) omnidirectional channel opened up by an omnidirectional wireless radio whose range covers all the involved devices. Such a situation is depicted in FIG. 7. Here, the HD wireless source device 71 has the possibility to configure its directional antenna to use a radiation patterns with two main lobes which can reach two HD wireless sinks 72 and 73 through a line of sight (LOS) link and a reflected path link (Non-LOS).

The RLC also provides the above mentioned HD wireless source and sink devices with the necessary means to implement a device remote control by sending or receiving commands via the omnidirectional link. This functionality would allow a user to activate a Blue-ray player to play a film by operating the TV where the user desires to watch the film. On top of the RLC proposed here, a MAC protocol uses the omnidirectional link to manage standard MAC functions like network discovery, network formation, association, access control in case of multiple accesses, etc. Every time the MAC protocol discovers a new device, it signalizes the RLC unit to run the beam selection algorithm to build the corresponding link table.

Figure 8:
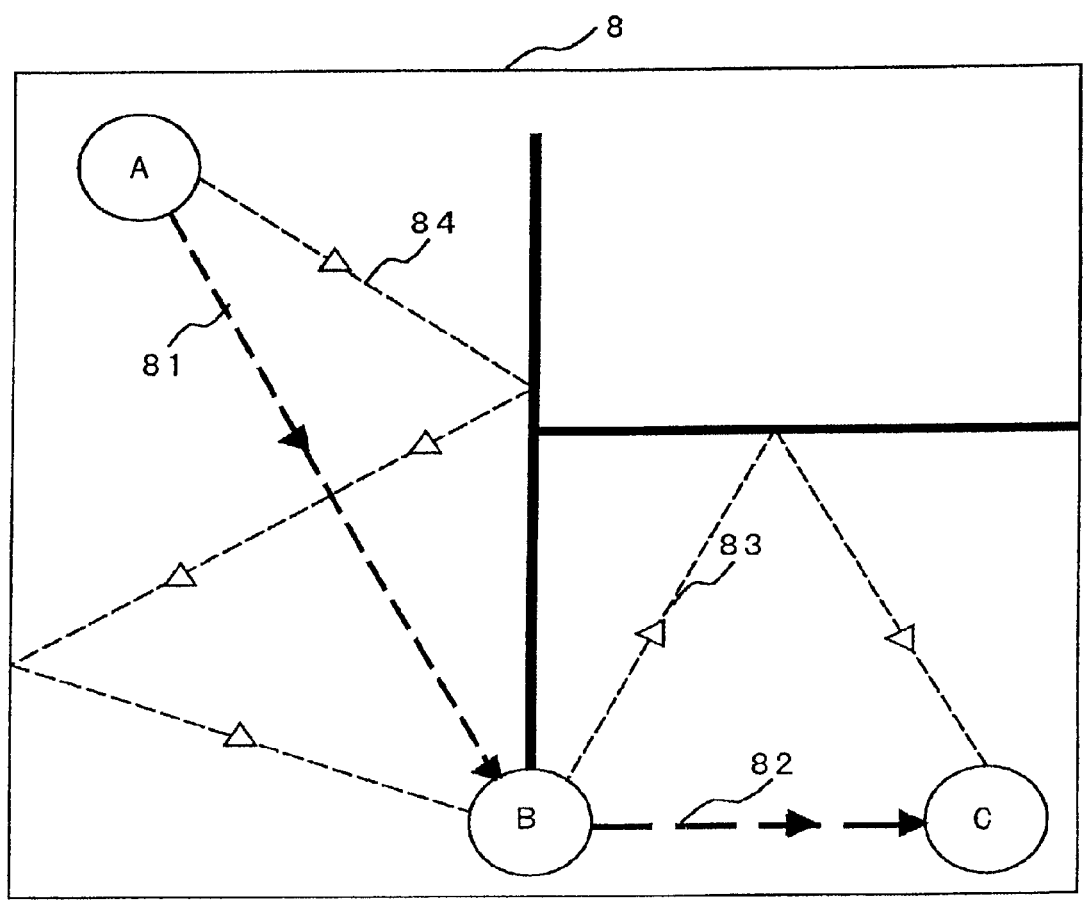
FIG. 8 shows a transmission scenario in a home network environment.

A possible scenario is the one shown in FIG. 8, which represents a household 8, where another embodiment A of a transmitter being a blue ray player, another embodiment C of a receiver being an HD TV and yet another embodiment B of a relay being an HD wireless relay are depicted. The user wants to watch an HD movie in the device C which will be played in the device A. Since both A (source) and C (sink) are out of range to each other for the mm-wave link, the relay acts like a bridge between both devices. It is assumed that the MAC protocol has already set up the network and run the beam selection algorithms in the different devices to build up the ranking lists and to create a global map with the HD transmission converging areas and the link qualities. This coverage map is distributed over the network in such a way that every device has knowledge about which devices it can reach, how, and with which link quality.

The omnidirectional out-of-band link range covers the complete household in such a way that the user may select to play the movie by using the HD TV as input. The commands given to the HD TV are sent via this channel directly to the blue-ray player A in the other room. Based on the coverage map and the ranking list, A selects the link 81 to start streaming the HD content to the HD relay B. It then selects the first link in the list 82 to retransmit the content to C. At the same time, an HDCP protocol data exchange takes place through the back channel directly between A and C penetrating the separating wall. The additional delay introduced by the wireless relay has no impact on the HDCP protocol, which would probably fail if the HDCP data exchange would need to be done using a mm-wave bidirectional link.

If at some time during the HD streaming a person or some other object compromises any of the used links 81 or 82, the RLC unit in the affected devices would detect degradation in the channel quality thanks to the constant links conditions update done by the beam tracking algorithm. Once this degradation has been detected, a handover of the HD streaming to the second best links 84 or 83 is done seamlessly by the RLC using the out-of-hand channel created by the embodiments of omnidirectional wireless radios in each device A, B and C. If later on, the beam tracking algorithm detects that the LOS links are operative again (the obstacle has been removed), the transmission of the HD content is moved back to these links.

The above described invention therefore allows the steady flow of wirelessly transmitted high data rates via directional antennas despite the fact that high density data transmitted through the latter are very sensitive to delays or physical obstructions like walls or people passing through the transmission coils. The inventive omnidirectional out-of-band radio link opens up an additional data channel that remedies above shortcomings by uncoupling important control data from the main data channel to avoid delays and by providing a radio channel that is less sensitive to physical obstructions.

The invention claimed is:

1. A wireless transmitter, comprising:
a transmitter radio unit working in the millimeter wave frequency band using a directional antenna;
a bidirectional radio unit working in a frequency range different from said transmitter radio unit and using an omnidirectional antenna;
a radio link control unit (RLC) to control said radio units, wherein the radio link control unit is provided to switch, steer or form an antenna beam of the directional antenna of the transmitter radio unit; and
a sounding channel frame generator for sending channel sounding frames transmission messages via the transmitter radio unit to determine channel conditions of an active antenna beam combination and other possible beam combinations with a wireless receiver or a wireless relay, wherein
the bidirectional radio unit is adapted to receive channel measurement values from the wireless receiver or the wireless relay,
the channel measurement values are values determined based upon the channel sounding frames transmitted via the transmitter radio unit, and
the radio link control unit switches, steers or forms the antenna beam of the directional antenna of the transmitter radio unit based upon the channel measurement values.

2. The wireless transmitter defined in claim 1, wherein the directional antenna provides one or more beams.

3. The wireless transmitter defined in claim 1, further comprising a ranking list database comprising a table containing the channel measurement values of the active antenna beam combination and other possible beam combinations.

4. A wireless receiver, comprising:
a receiver radio unit working in the millimeter wave frequency band using a directional antenna;
a bidirectional radio unit working in a frequency range different from said receiver radio unit and using an omnidirectional antenna;
a radio link control unit (RLC) to control said radio units, wherein the radio link control unit is provided to switch, steer or form an antenna beam of the directional antenna of the receiver radio unit; and
a channel measurement unit for collecting channel measurement values of an active antenna beam combination and other possible beam combinations with a wireless transmitter or a wireless relay,
wherein the bidirectional radio unit is adapted to send the channel measurement values to the wireless transmitter or the wireless relay,
the channel measurement values are values determined based upon channel sounding frames received by the receiver radio unit, and
the radio link control unit switches, steers or forms the antenna beam of the directional antenna of the receiver radio unit based upon the channel measurement values.

5. The wireless receiver defined in claim 4, wherein the directional antenna provides one or more beams.

6. The wireless receiver defined in claim 4, further comprising a ranking list generator adapted to generate and rank the channel measurement values of the active antenna beam combination and other possible beam combinations.

7. A device, comprising:
a receiver radio unit working in the millimeter wave frequency band using a first directional antenna;
a transmitter radio unit working in the millimeter wave frequency band using a second directional antenna different from said first directional antenna;
a bidirectional radio unit working in a frequency range different from said receiver radio unit and said transmitter radio unit and using an omnidirectional antenna; and
a radio link control unit (RLC) to control said radio units, wherein the radio link control unit is provided to switch, steer or form an antenna beam of the directional antenna of the transmitter radio unit or the receiver radio unit based upon channel measurement values received via the bidirectional radio unit, wherein
the device is a single wireless relay device, and
the channel measurement values are values determined based upon channel sounding frames sent via the transmitter radio unit or received by the receiver radio unit.

8. The wireless relay defined in claim 7, wherein each of the directional antennas provides one or more beams.

9. The wireless relay defined in claim 7, whereby the bidirectional radio unit is adapted to forward the channel measurement values from a wireless receiver or another relay to a wireless transmitter or said another relay.

10. The wireless relay defined in claim 9, whereby the receiver radio unit and the transmitter radio unit are adapted to forward the channel sounding frames transmission messages from the wireless transmitter or another relay to the wireless receiver or said another relay.

11. The wireless relay defined in claim 7, further comprising a ranking list generator adapted to generate and rank channel measurement values for at least one of the first directional antenna and the second directional antenna.

* * * * *